UNITED STATES PATENT OFFICE.

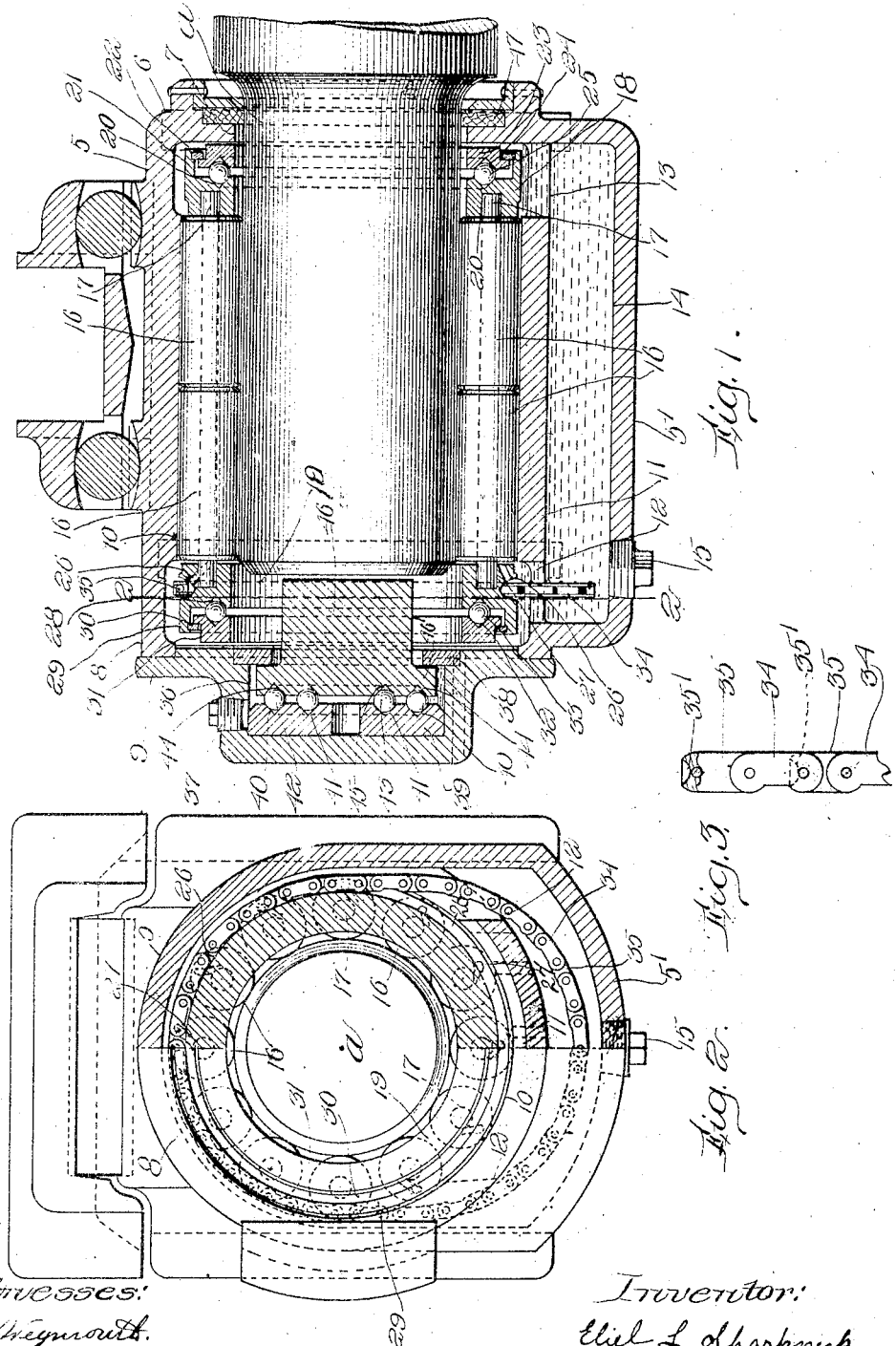

ELIEL L. SHARPNECK, OF WINTHROP, MASSACHUSETTS, ASSIGNOR TO ANTI-FRICTION ROLLER BEARING COMPANY, A CORPORATION OF ARIZONA.

CAR-AXLE BOX.

1,100,402.  Specification of Letters Patent.  Patented June 16, 1914.

Application filed July 20, 1910. Serial No. 572,826.

*To all whom it may concern:*

Be it known that I, ELIEL L. SHARPNECK, of Winthrop, in the county of Suffolk and State of Massachusetts, have invented certain new and useful Improvements in Car-Axle Boxes, of which the following is a specification, reference being had to the accompanying drawings, forming part thereof.

This invention has reference to improvements in car axle boxes and particularly to car axle boxes provided with antifriction bearings, so called.

One object of the invention is to so construct a car axle box having antifriction bearings for the car axle that automatic circulation of lubricant through said bearings may be effected.

Another object of the invention is to improve the construction of car axle boxes and their bearings.

The invention consists in the novel construction of the car axle box and its antifriction bearings.

The invention also consists in the novel means for supplying lubricant to said bearings.

The invention also consists in such other novel features of construction and combination of parts as shall hereinafter be more fully described and pointed out in the claim.

Figure 1, represents a vertical sectional view of the improved car axle box taken on line 1—1 Fig. 2, parts of the same being shown in full. Fig. 2, represents a view partly in end elevation and partly in section, on line 2—2 Fig. 1. Fig. 3, represents an enlarged detail view of a portion of the lubricant carrying chain.

Similar numerals of reference designate corresponding parts throughout.

As shown in the drawings, in its preferred form, 5 represents the car axle box having the end 6, furnished with the opening 7 for the axle $a$, and the open end 8 provided with the closure 9. Within the box is the annular way 10 the lower portion of which is formed by the partition 11 having the openings 12, 12 and 13 while, below said partition 11, the bottom 5' of the box forms the oil reservoir 14 and has a draw off opening closed by the plug 15.

Rotatably mounted in the way 10 is a roller bearing comprising the annular series of rolls 16, 16, rotatably mounted on the shafts 17, 17 the ends of which are driven into sockets respectively of the rings 18 and 19 and the whole forming a cage to receive the axle $a$ for which the rolls 16, 16 form a bearing free to move with said axle. Ring 18 has the V shaped groove, or ball race 20 and the rim 21 in which the collar 22 is mounted, and held from outward movement by said collar, is the antifriction ring 23 having a V shaped groove or ball race 24 between which and the groove 20 is located a series of balls 25, 25 so that the ring 23 may act as an antifriction thrust bearing if brought into contact with the end 6 of the box or casing 5.

Ring 19 has the peripheral groove 26 furnished adjacent to each of the shafts 17, 17 with inclined ducts 27, 27 which communicate with the face of said ring 19 against which the rolls 16, 16 bear at or near the periphery of the shafts 17, 17 so that oil passing through said ducts is delivered to the ends of the rolls 16, 16 and to the peripheries of the shafts 17, 17. Said ring 19 has in its end the V shaped groove or ball way 28 and the peripheral rim 29 in which the collar 30 is mounted whereby the antifriction ring 31 is retained in position so that its V shaped groove or ball way 32 bears at two points against the balls 33, 33 located between said ball way 32 and the similar ball way 28 of the ring 19. Engaged with the groove 26 of ring 19 is the endless chain 34 the alternate links 35 of which have depressions 35' in their ends as shown in Fig. 3. This chain 34 extends through the openings 12, 12 in the partition 11 and into the oil reservoir 14 as shown.

The closure 9 has the pocket 36 furnished with an inlet closed by the screw plug 37 and, said closure, is provided with the collar 38. Within said pocket 36 is seated the block 39 having the V shaped ball ways 40, 40 for the balls 42, 43 against which similar ball ways 44, 45 of the thrust resisting member 46 bear, said member 46 being rotatably retained against said balls 44, 45 by the collar 38 bearing against the enlargement 46' of said member 46.

Comparatively thin oil or other lubricant is supplied through the inlet in the closure 9 and the plug 37, of said inlet, is then replaced; such lubricant passes down between the blocks 39 and the member 46 until it flows over the edge of the collar 38, which collar retains a portion of the lubricant within the pocket 36. The lubricant then passes down inside the box or casing 5 and through the openings 12, 12 in the partition 11 to the reservoir 14.

In operation the rotation of the shaft or axle $a$ causes the rotation of the rolls 16, 16 and, such rolls being in contact with the way 10, the cage, formed by said rolls, their shafts and the rings 18 and 19, revolve around axle $a$ and effects the driving of the chain 34 whereby the lubricant taken up by said chain in the cups 35 thereof or adhering to the chain, during the passage of the chain through the lubricant in reservoir 14, is delivered to the groove 26 from whence said lubricant flows through the ducts 27, 27 to the shafts 17 and along said shafts to the ring 18, the surplus lubricant finally flowing back through the opening 13, in partition 11, to the reservoir 14.

While this improved box is closed to the entrance of coarse dust and grit, by the closure 9 and the washer 47, bearing against the axle $a$ at the opening 7 of the box, it is found, that after considerable use, fine grit sometimes works its way into the box but such grit is carried, by the flow of the lubricant, into the reservoir 14 and when the lubricant becomes unduly charged with such grit said lubricant may be drawn off through the opening normally closed by the plug 15.

Having thus described my invention, 1 claim as new and desire to secure by Letters Patent—

A car axle box comprising a casing, an axle end journaled therein, an end thrust bearing of less diameter than the axle end, an anti-friction bearing surrounding one end of the thrust bearing and in spaced relation thereto to provide a chamber, an oil reservoir, shafts mounted in said anti-friction bearing to receive rollers, said anti-friction bearing having conduits to each of said shafts, and a flexible means comprising a chain suspended over said anti-friction bearing and extending into said oil reservoir for transferring the lubricant to said roller and end thrust bearings, said chain being formed of links provided with recesses therein to carry the lubricant.

ELIEL L. SHARPNECK.

Witnesses:
 FRANCIS J. GEOGAN,
 HENRY J. MILLER.